United States Patent [19]

Laue

[11] Patent Number: 5,228,818
[45] Date of Patent: Jul. 20, 1993

[54] FASTENER SYSTEM FOR MALE AND FEMALE THREADED MEMBERS

[75] Inventor: Charles E. Laue, Wilmette, Ill.

[73] Assignee: Charles E. Laue Trust, Wilmette, Ill.

[21] Appl. No.: 712,554

[22] Filed: Jun. 10, 1991

[51] Int. Cl.⁵ .................. F16B 35/02; F16B 35/04; F16B 39/284

[52] U.S. Cl. .................. 411/385; 411/306; 411/366; 411/419

[58] Field of Search ............ 411/222, 306, 308–311, 411/366, 385, 418–421, 284; 29/525.1

[56] References Cited

U.S. PATENT DOCUMENTS

| | | | |
|---|---|---|---|
| 1,327,934 | 1/1920 | Alcock | 411/385 |
| 1,992,272 | 2/1935 | Wilson | 411/222 |
| 2,407,160 | 9/1946 | Kahn | 411/385 |
| 2,525,299 | 10/1950 | Johnson | 411/419 |
| 2,549,393 | 4/1951 | Siesel | 411/419 |
| 3,092,884 | 6/1963 | Elms | 411/385 |
| 3,457,979 | 7/1969 | Munro | 411/284 |
| 4,822,225 | 4/1989 | Haberle | 411/385 |

Primary Examiner—Neill R. Wilson

[57] ABSTRACT

A fastener system is providing having a male threaded member and a female threaded member with arrangements for achieving a locking connection between the parts to prevent relative rotation of the parts due to vibration. In an embodiment of the invention, the male member is comprised of a folded over plate with threads formed on an end portion, either the folded end or the free ends, or both, which is engageable into the female member. In another embodiment, the male member is formed of two pieces overlying one another with threads formed on the overlying portions. The thickness, width and number of threads on the male member can be selectively determined to provide the desired torque for rotating the two members relative to one another. The male member can be configured as a linear member, an offset member, as a clevis, or other non linear shapes, which shapes are particularly easy to accomplish by forming the male member of two legs either by folding or as separate pieces.

29 Claims, 9 Drawing Sheets

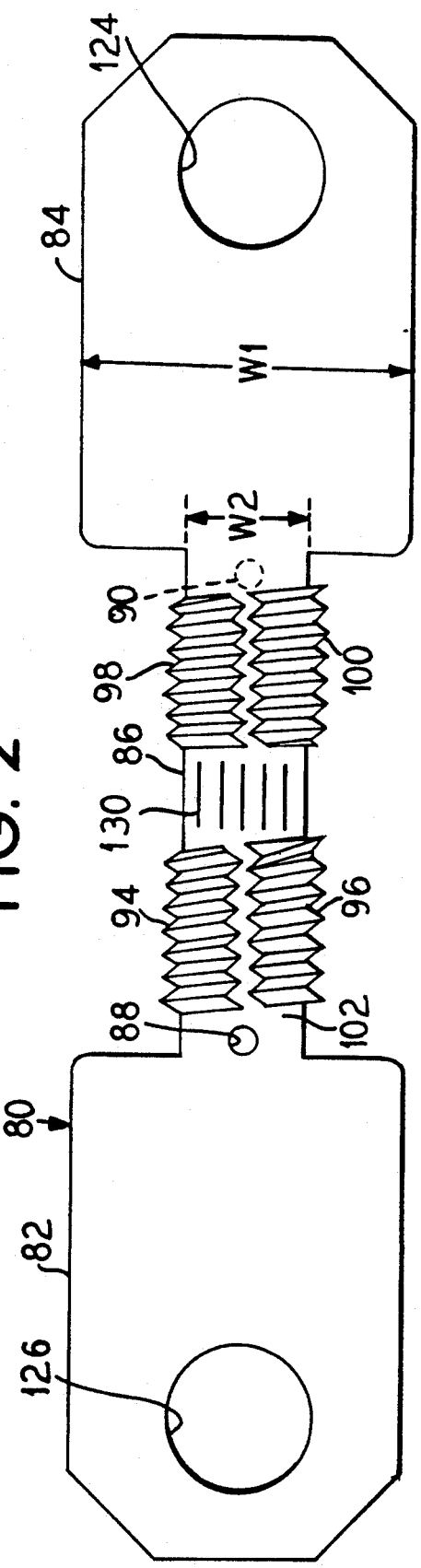
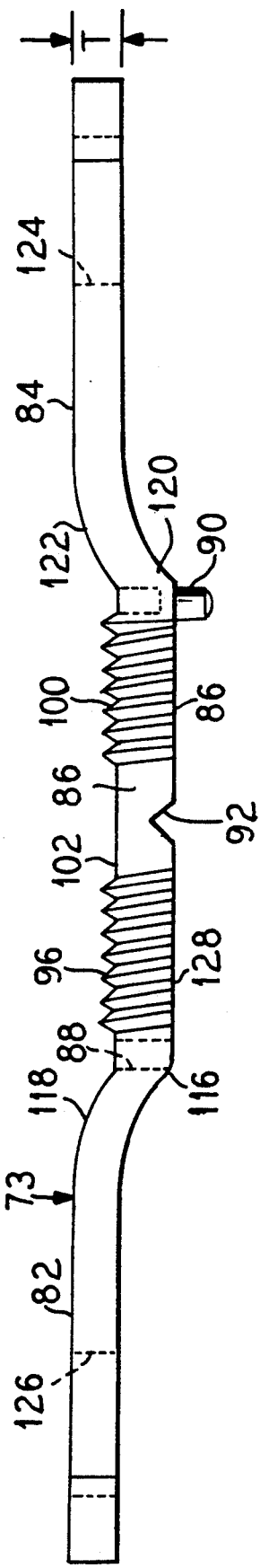
FIG. 2
FIG. 3

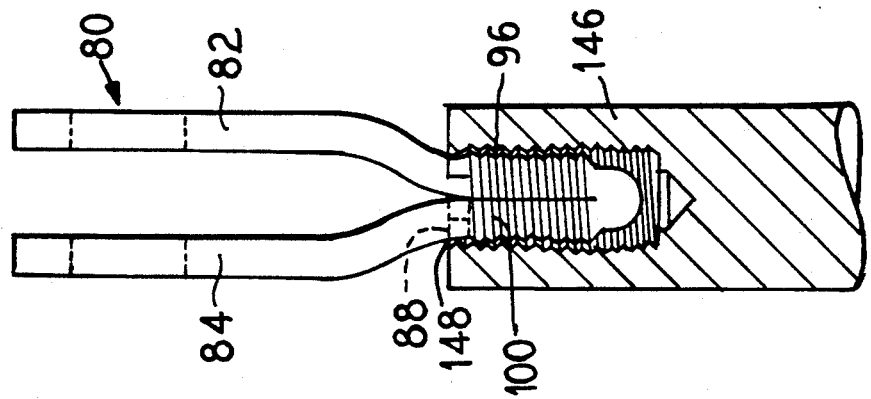
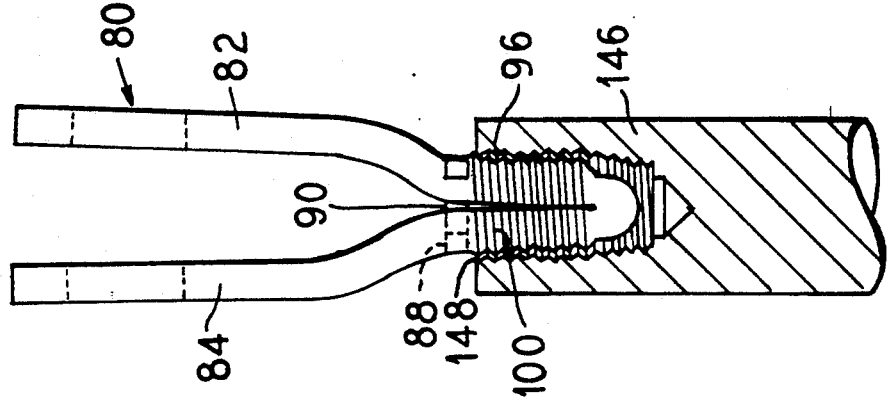
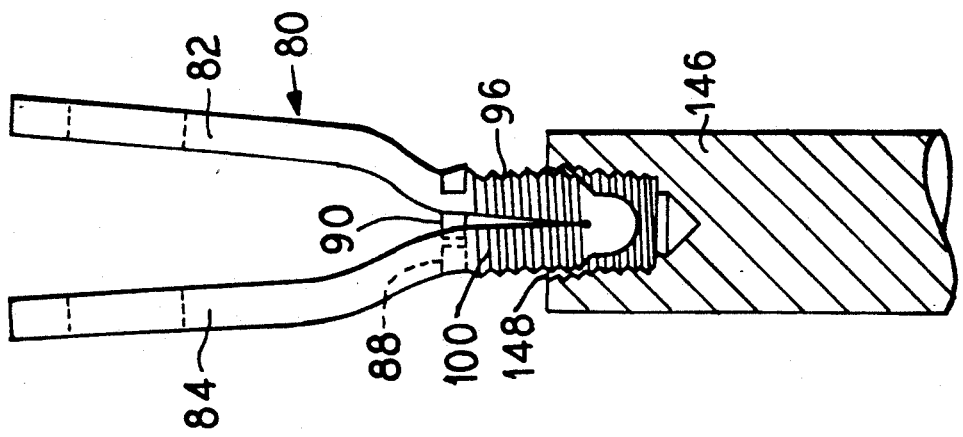

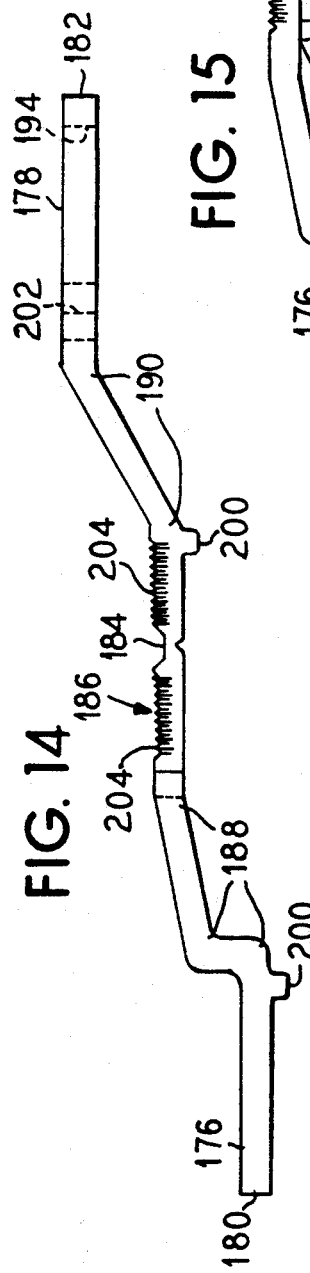
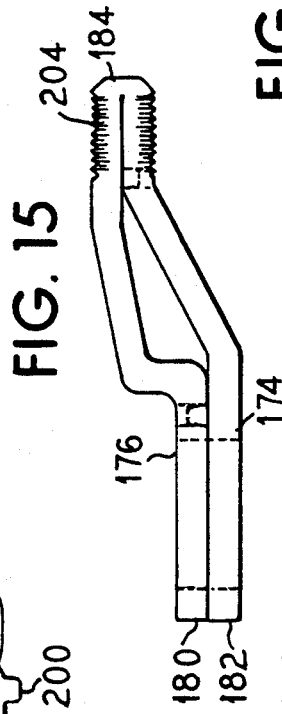
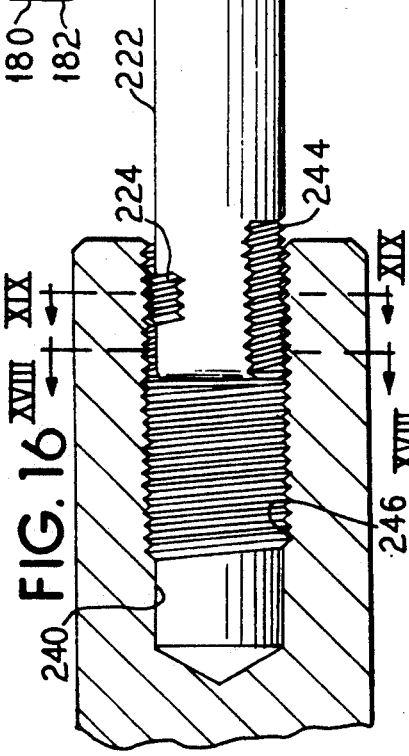
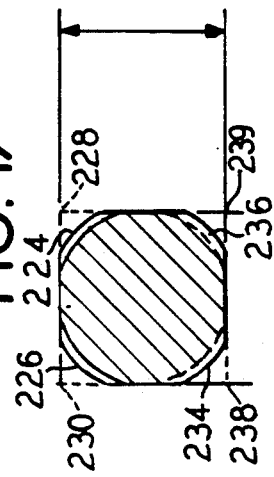
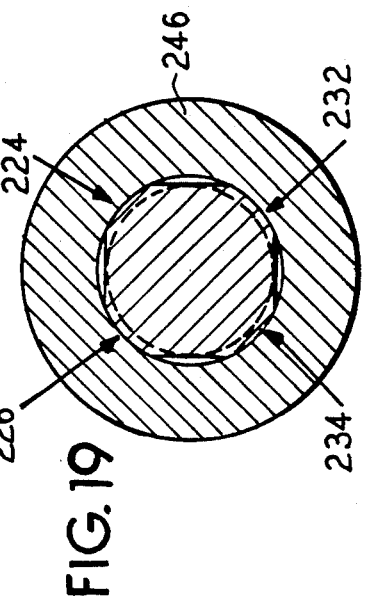
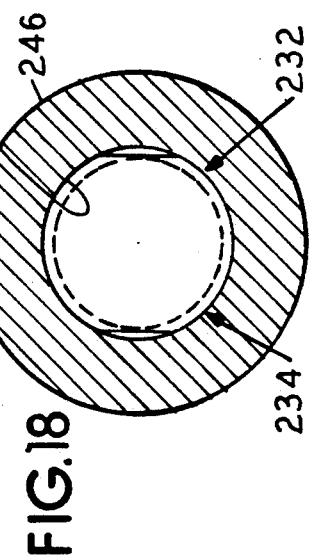

FASTENER SYSTEM FOR MALE AND FEMALE THREADED MEMBERS

BACKGROUND OF THE INVENTION

The present invention relates to a fastener system, and in particular to a fastener system having an internally threaded female member and an externally threaded male member.

Many types of threaded fastener systems are known, including my fastener system disclosed in U.S. Pat. No. 4,901,426 utilizing a male member with a rectangular end portion having thread segments pressed into the edges or corners of the rectangular end portion which mate with the internal threads of a female member. In such a device, torque was selected by adjusting the position of the thread segments axially relative to one another to provide an interference thread between adjacent thread segments. However, the torque required for insertion of such a fastener increased as the male member was inserted further into the female member due to an increasing number of interference threads being engaged.

Although not limited to any particular application or environment, the fastener system of the present invention has utility in pedal rods used in brakes for automotive vehicles and more particularly to such a brake wherein an annular resilient diaphragm is clamped around its outer perimeter by a pair of annular housing or shell members defining spaced vacuum chambers at opposite sides of the diaphragm. The diaphragm has a central opening tightly clamping an annular valve body in an air-tight snap fit within an annular groove thereof. The valve body is urged into one of the vacuum chambers in response to pressure of an operator's foot on a brake pedal, driving a clevis of a pedal rod into the valve body and thereby urging the valve body against a compression rod assembly which in turn actuates the piston of a conventional master cylinder containing liquid which actuates the pistons of the wheel brakes. As the pedal rod is urged into the valve body, atmospheric pressure is admitted to one of the chambers while the other chamber containing the compression rod assembly is under vacuum. This causes atmospheric pressure to apply the wheel brakes in response to very slight pressure on the brake pedal.

In a known clevis style pedal rod assembly, four separate parts are utilized to form the assembly. A first piece comprises a U-shaped clevis member which has, as a second piece, a nut, welded thereto. A threaded rod with a separate nut is threaded into the nut captured on the clevis and the two nuts are then locked together to join the pieces in final assembly. Such an assembly requires an excessive number of parts and also entails a high manufacturing cost, particularly in the welded assembly of the first nut to the clevis member.

However, any assembly for the appliance industry, automobile industry, farm equipment industry, air conditioning industry, aircraft industry, military vehicles industry, etc. would be applicable for a fastening system embodying the principles of the present invention where there is vibration potential or requirement of torque control.

It would be an improvement in the art if a fastener system utilizing a small number of parts were provided which allows for repeatability or reuse of the fastener and allows for the same selected torque each time the fastener is used. It would also be an improvement in the art if a fastener system were provided which could provide a clevis style or other non-linear configuration male member while reducing the cost and the number of parts necessary for such an assembly. Also, it would be an improvement in the art if a fastener system were provided which allows for selecting a desired maximum torque for assembling and disassembling a male and female member, which torque remains constant during assembly and disassembly of the two parts.

SUMMARY OF THE INVENTION

The present invention provides a fastening system for male and female threaded members which allows for repeatability or reuse of the fastener and permits selection of the torque required for assembly and disassembly. In a preferred embodiment only two parts are required, even to obtain a clevis or offset arrangement. Other features, such as having a high tolerance for vibration are provided.

In a first embodiment of the invention, the externally threaded male member may be a generally flat plate member folded over at a central folded portion to form a new end at the fold, the central portion having at least portions or segments of external threads formed thereon which are engageable with the internal threads of the first member. The central portion has a reduced width as compared with the free end portions of the plate. When the plate is folded over, the folded end comprises a generally rectangular cross section, which may be a square cross section. Thread segments are formed on the edges or corners of the folded end in a manner such as that disclosed in my U.S. Pat. No. 4,901,426, so that a discontinuous standard thread is formed which mates with the internally threaded female member. The folded plate may also have thread segments formed at the free ends such that when the plate is folded, the free ends overlie each other to form a rectangular cross section with the thread segments at each edge.

In a second embodiment of the invention, the externally threaded member could be formed as two pieces with ends overlying each other into which thread segments could be impressed as described above.

In either embodiment, the torque required for assembling the male member into the female member, can be selected by adjusting one or more of the three variables of: width of the threaded end; thickness of the threaded end; and number of thread segments. By adjusting the width or thickness of the threaded end, a desired radial pressure can be selected which will provide the desired torque. When the female member has a blind hole, the maximum amount of torque can be selected by providing a predetermined number of thread segments on at least one edge or corner of the threaded end. For example, two adjacent edges can have a full threaded length, while the two remaining edges can have a selected fewer number of threads to provide the desired torque. Once the selected number of threads have entered the threaded aperture, the torque remains constant at the desired level, unlike a standard threaded fastener which has an increasing torque as additional threads are introduced into the aperture. By providing a desired torque, the fastener can be reused, that is, threaded in and out a number of times. Also, with the two-piece or bent over construction, it has been determined that the fastener system, when assembled, is highly tolerant of vibration thereby obviating the need for chemical locking solutions, crimping or other measures to be taken which would prevent reusability of the fastener system.

The two legs of the folded or separate male members may be identical in shape, overlying and in flush abutment along their entire length, or may be identical in shape, but not in flush abutment along their entire length sometimes resulting in a clevis, or may be different in configuration allowing for an offset male member or other configuration. Also, when separate legs are used for the male member, the legs may be of different materials to provide particular desired characteristics.

An object of the invention, when utilized in a pedal rod environment, is to form the piece of the pedal rod, which is attached to the brake pedal by a clevis, in a manner which permits it to transmit compression to the valve body under load of the order of 3,200 pounds or more during panic braking and to withstand tension of at least 450 pounds caused by release spring pressure upon release of the brake pedal. The clevis is attached by threads to a female shaft piece of the pedal rod. Then when this clevis is assembled into a female threaded part, after assembly and adjustment, it can be crimped on the O.D. of the female member for doubly ensuring the integrity of assembly. The male member can be of various configurations to meet the needs of the appliance, automobile, farm equipment, air conditioning, aircraft, military vehicle industries, etc.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 2 is a side elevational view of an embodiment of part of the pedal rod of FIG. 1 before it is folded to define an eye-piece in the form of a clevis;

FIG. 3 is an edge elevational view of the pedal rod shown in FIG. 2;

FIGS. 7A, 7B and 7C show side elevational views of the pedal rod, FIG. 7B showing the rod after it has been partially threaded into a shaft piece, the view at the center showing the rod further threaded, and FIG. 7C showing the rod completely threaded into the shaft piece;

FIG. 14 is an edge elevational view of the embodiment of FIG. 13;

FIG. 15 is an edge elevational view of the embodiment of FIG. 13 after folding;

FIG. 16 is a partial side sectional view of a male member having a select number of threads thereon for providing torque control;

FIG. 17 is a sectional view of the male member only taken through lines XVII—XVII of FIG. 16;

FIG. 18 is a sectional view of the male and female members taken along line XVIII—XVIII of FIG. 16;

FIG. 19 is a sectional view of the male and female members taken along line XVII—XVII of FIG. 16;

DETAILED DESCRIPTION OF THE PREFERRED EMBODIMENTS

Figure 1:
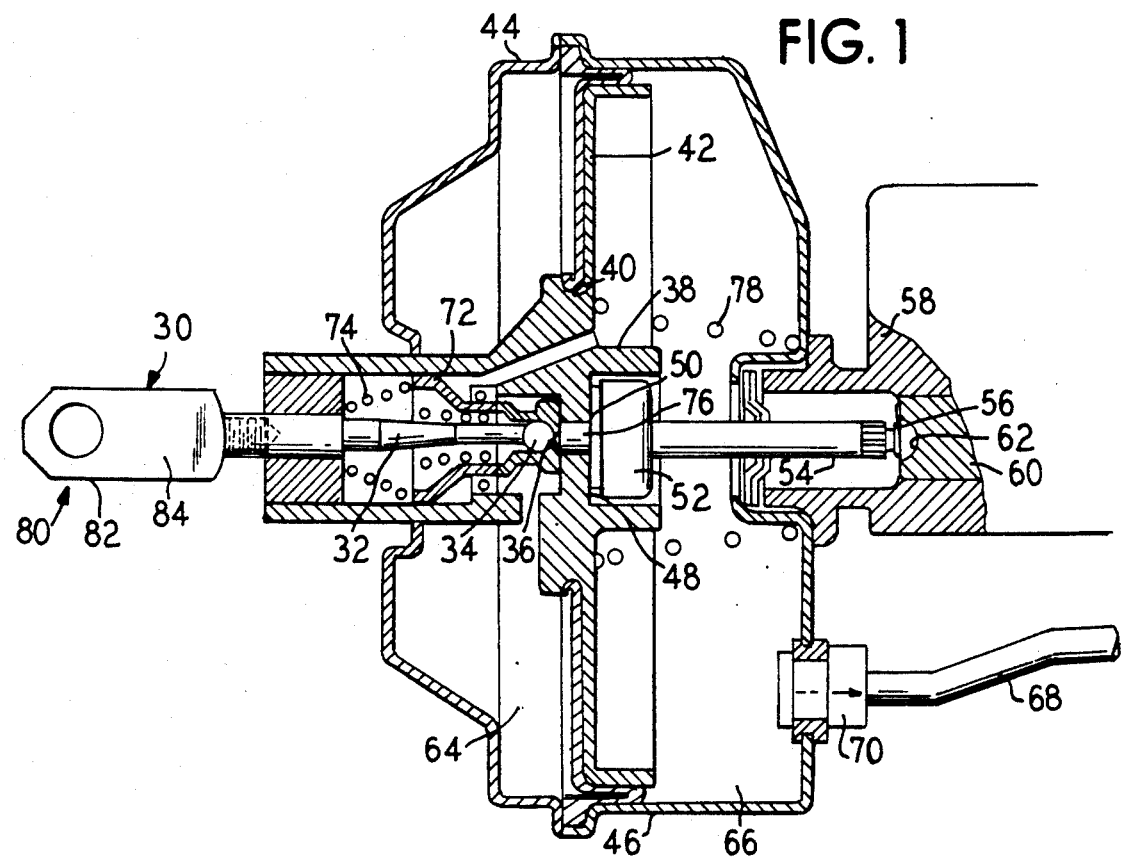
FIG. 1 is a schematic axial sectional view, partly in elevation, of a power brake unit comprising an embodiment of a pedal rod embodying the principles of the present invention.

In order to describe the invention in detail I have selected the specific environment of an automotive power brake unit, without limiting the invention to such an environment, yet using such an environment for purposes of explanation of the utility of the invention. Referring first to FIG. 1, the power brake unit is conventional except for the pedal rod assembly generally designated 30 (hereinafter described in detail). The power brake unit has a shaft piece 32, the button end 34 of which is received in a complementary, cylindrical recess or socket 36 of an annular valve body 38 which has an annular recess or groove 40 having an air-tight snap fit with the inner diameter of an annular resilient diaphragm 42, the outer diameter of which is clamped by a pair of annular shell or housing members 44 and 46.

The valve body 38 comprises a seat 48 for a rubber pad 50 engaged by a large end 52 of a compression rod assembly 54 which has a smaller plunger end 56 received within a conventional master brake cylinder 58 removably attached to the shell 46. The plunger end 56 of the compression rod assembly tightly engages the master cylinder piston 60 at 62 for actuation thereof as hereinafter described.

The diaphragm 42 defines spaced vacuum chambers 64 and 66 within the shells 44 and 46, respectively, both of said chambers being connected in the usual manner to intake manifold (not shown) of the vehicle's internal combustion engine through a hose 68 and check valve 70.

When pressure is applied by the operator to the brake pedal, the pedal rod 30 is urged into a conventional valve 72 against resistance of a compression release spring 74 reacting against the valve body 38. This movement of pedal rod 30 causes conventional valve 72 to cut off communication between chambers 64 and 66 and to admit atmospheric pressure to chamber 64 causing the valve body 38 and diaphragm 42 to exert that pressure against the compression rod assembly 54 which in turn actuates the piston 60 of the master cylinder.

When the engine (not shown) of the automotive vehicle (not shown) is running, air is drawn through hose 68 and check valve 70. This creates a vacuum in both chambers 64 and 66. When pedal rod 14 is urged into chamber 64 by depression of a brake pedal (not shown) chamber 66 remains under vacuum but atmospheric pressure is admitted to chamber 64 by valve 72 thus exerting atmospheric pressure against the diaphragm 42 which moves into chamber 66 along with valve body 38. Inasmuch as atmospheric pressure is of the order of 14 pounds per square inch at sea level, with a ten inch diameter diaphragm 42 the braking pressure amounts approximately 1,000 pounds per square inch by the application of 10-18 pounds of force to the brake pedal.

As this actuation occurs, the rubber of disc 50 flows into a hole 76 of a wall of the valve body 38 at the inner end of its socket 36. This is very important in that the braking force is caused to be proportionate to the pressure of the operator's foot on the brake pedal, thus giving the operator a sense of "feel" that would be lacking if such flowing of the rubber of disc 50 did not occur.

Upon release of pedal rod 30 the valve 72 closes, cutting off atmospheric pressure from chamber 64 and reconnecting it to chamber 66 so that chamber 64 is again under vacuum, whereupon the resiliency of the diaphragm 42 and a return spring 78 in chamber 66 returns the parts to no-brake position shown in FIG. 1.

The pedal rod assembly shown in FIGS. 1-7C has an end part male member 80 formed as a clevis comprising two eye-pieces or legs 82 and 84 (FIGS. 2 and 3), which are formed of a free machining material such as punch-press steel interconnected by a central strap 86. A round aperture or eye 88 is preferably, but optionally provided through the strap adjacent to its connection to leg 82 which is adapted for receiving an associated round lug 90 adjacent the connection of strap 86 to leg 84 when the strap 86 is folded over on a score 92 as hereinafter described. The strap is threaded at thread segments 94, 96, 98 and 100. The threads may be formed onto the male member 80 in a number of different manners, including by pressing the threads into the male member as disclosed in my U.S. Pat. No. 4,901,426 incorporated herein by reference. The thread segments 94, 96, 98 and 100 are provided on a front surface 102 of the male member 80, preferably before folding, but they could also be formed thereon after folding, such that after folding, the thread segments align in a fashion to provide a discontinuous standard thread.

Figure 20:
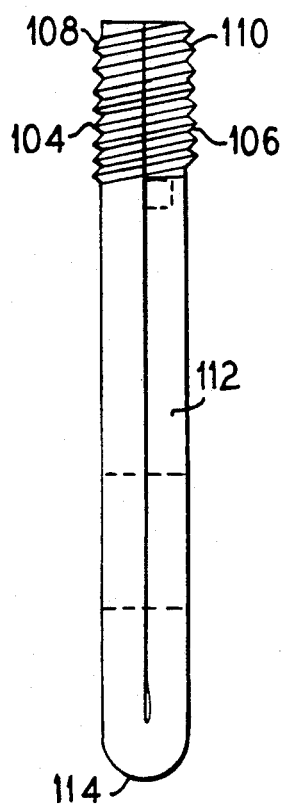
FIG. 20 is an edge elevational view of an alternate embodiment of a male member.

The folded male member 80 need not have the threads formed at the central strap 86. FIG. 20 illustrates that threads 104, 106 may be applied to original free ends 108, 110 of a plate-like member 112 such that the free ends 108, 110 will be threaded into a female member rather than a folded end portion 114. In some embodiments it may be desireable to provide threaded areas at both ends of a folded member, both at the folded end and at the free ends various other arrangements can also easily be imagined.

In the first embodiment of the male member 80 for use in a fastening system of the present invention (FIGS. 1-7C), the male member comprises a plate like member having a relatively constant thickness T and a selected width W1 at each end. The strap 86 has a reduced width W2. The male member 80 has a first bend 116 and a second, opposed bend 118 between the strap and the first leg 82. A third bend 120 and a fourth, opposed bend 122 are positioned between the strap 86 and the second leg 84. The male member 80 is symmetrical about the central strap 86 and the first leg 82 and the second leg 84 are parallel to, but offset from the central strap 86. An aperture 124 is formed through the first leg 82 and an identically sized and positioned aperture 126 is formed in the second leg 84. The score 92 formed at a central location on a back surface 128 of the central strap 86.

Figure 5:
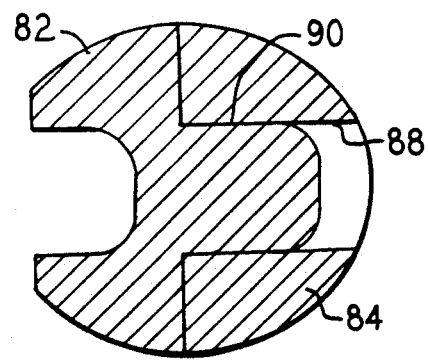
FIG. 5 is an enlarged sectional view taken on line V—V of FIG. 4.
Figure 6:
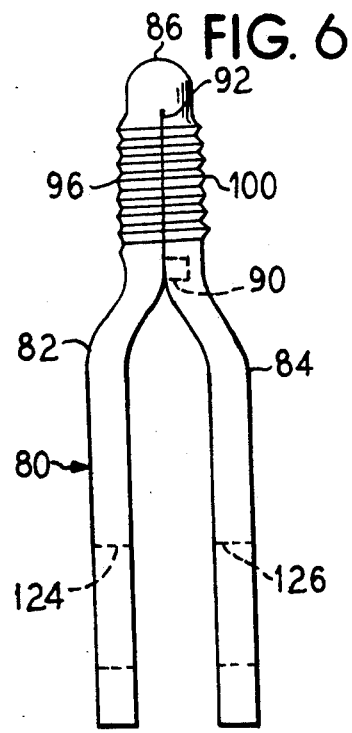
FIG. 6 is a side elevational view of the pedal rod of FIGS. 1-4 in its finished form.
Figure 4:
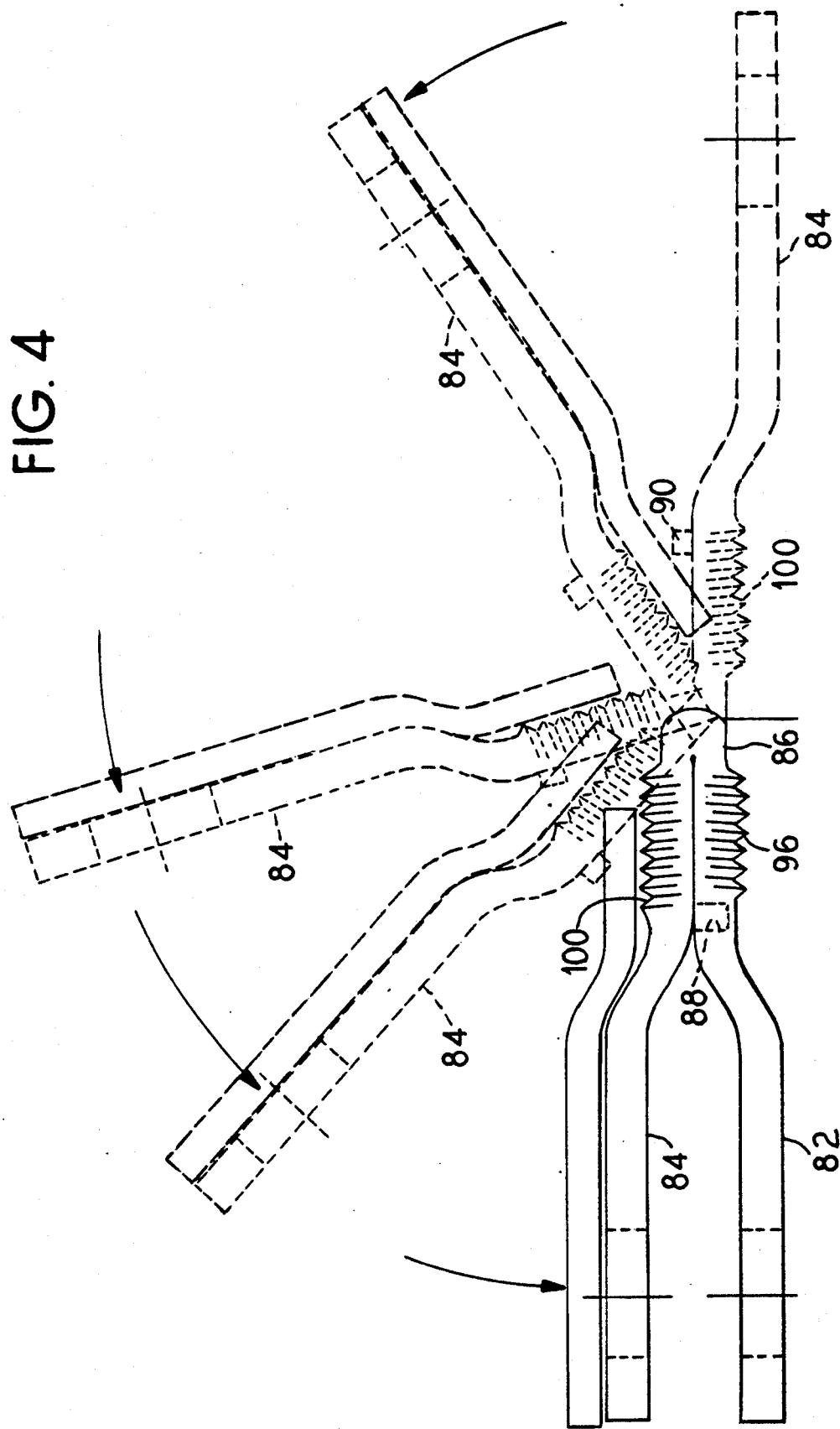
FIG. 4 is an edge elevational view of the pedal rod shown in FIG. 3 showing one manner in which it could be folded with one leg traversing 180°.
Figure 12:
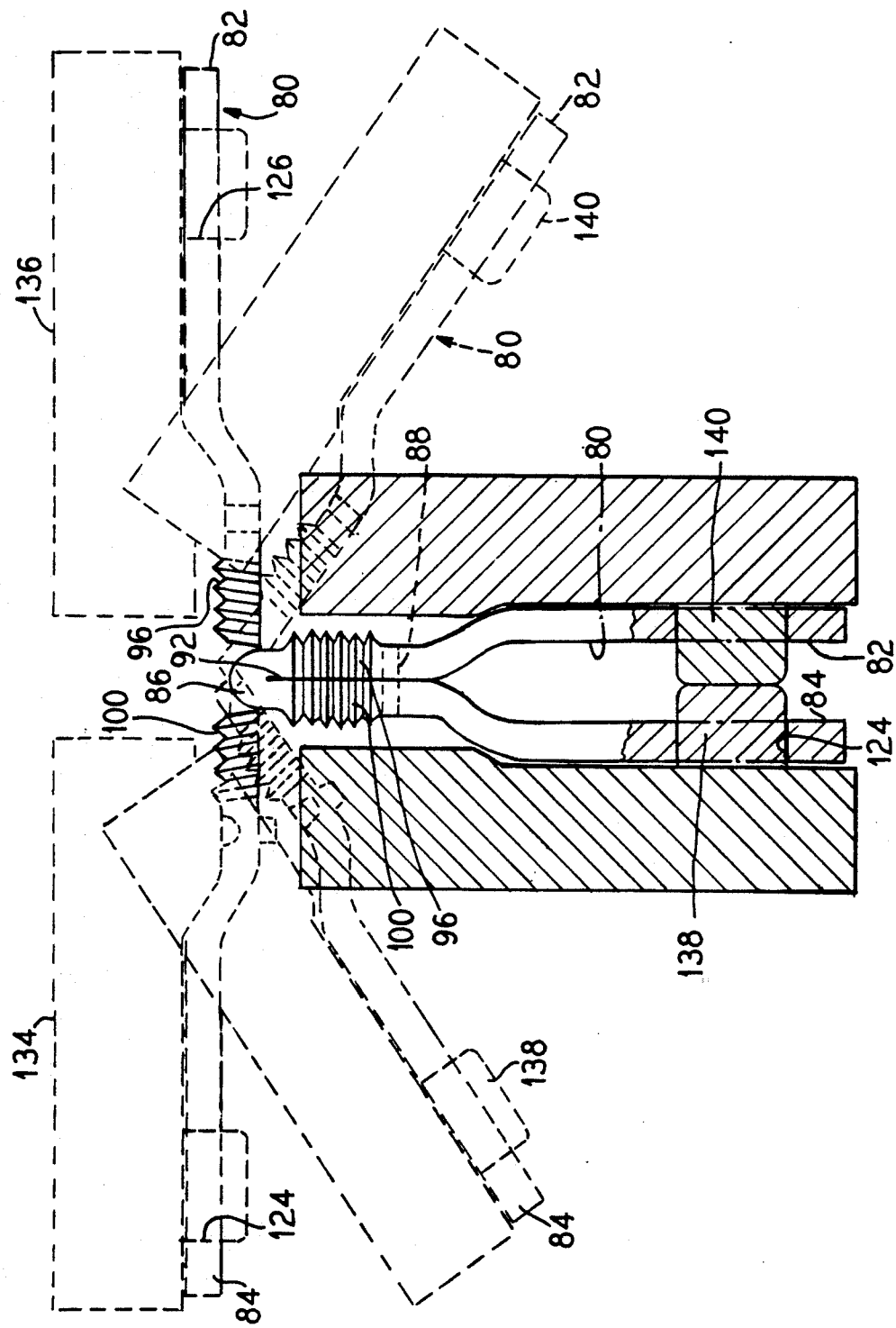
FIG. 12 is an edge elevational view of the pedal rod shown in FIG. 3 showing an alternate in which it could be folded with both legs each traversing 90°.

FIG. 4 shows one manner in which the strap 86 may be folded over on score 92. The strap 86 is folded over in this embodiment by rotating leg 84 through 180° about the score 92 until the round lug 90 is received within the eye 88 as shown in FIGS. 5 and 6. FIG. 12 shows another manner in which the strap 86 may be folded over on score 92. The male member 80 starts as shown in FIG. 4 and the parts thereof are identified by corresponding numerals. Provision of score lines 130 (FIG. 2), perpendicular to the fold and on the front surface 102 of the male member 80 at the fold location will assist in preventing cracking of the male member during the folding process.

In FIG. 12 two flat blocks 134 and 136 are shown in solid lines with eye-pieces 82 and 84 seated against blocks 134 and 136 preparatory to folding at the eye-pieces 82 and 84 to form a clevis. The blocks 134 and 136 have round projections 138 and 140 extending through the complementary holes 124 and 126 of the eye-pieces 82 and 84.

The blocks 134 and 136 rotate downward, each through 90°, to parallel positions shown at the bottom of FIG. 12. FIG. 12. shows the finished clevis 82-84 in phantom lines at the bottom of FIG. 12 with the projections 138 and 140 in place within their holes 124 and 126. Under the arrangement of either FIG. 4 or FIG. 12, the round lug 90 and the eye 88 form aligning means for the threads 94, 96, 98 and 100, holding them laterally when the legs 82, 84 are folded together as shown in FIGS. 5, 6 and 7.

As illustrated in FIGS. 7A, 7B and 7C, the male member 80 of the configuration shown in FIGS. 2 and 3 will be folded into a clevis shape and can be inserted into a female member 146 having an internally threaded aperture 148. FIG. 7A shows schematically, and in an exaggerated fashion, the male member 80 which is not folded completely such that the two legs 82, 84 are not quite parallel, thus making the male member 80 have a general V-shape. As the male member 80 is rotated relative to the female member 146 (FIG. 7B), the thread segments 94, 96, 98 and 100 on the male member 80 will engage the internally threaded aperture 148 of the female member 98 thus drawing the male member inwardly and pulling the legs 82, 84 together. FIG. 7C schematically illustrates the male member 80 being fully inserted into the female member 146 such that the legs 82, 84 are parallel. The apertures 142, 144 in the legs 82, 84 will be in alignment such that a bar or shaft can be inserted through the aligned apertures.

Figure 8:
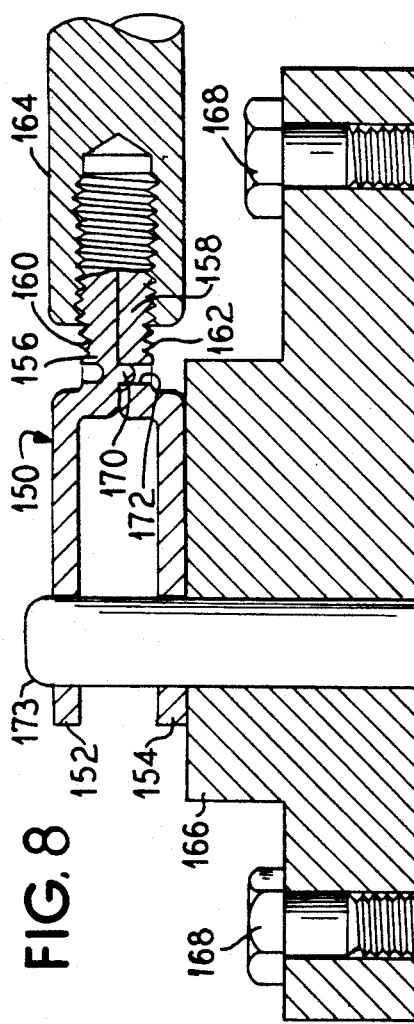
FIG. 8 is a sectional view of a modified pedal using a two-part clevis defining an end-piece.

FIG. 8 shows an alternate embodiment of the invention wherein a clevis portion 150 comprises two individual segments 152 and 154, each having two parts 156 and 158 in a flat face abutment and having thread segments 160 and 162 threaded into a female shaft piece 164. The parts 156 and 158 are assembled in a fixture 166 held by bolts 168 in a fine line assembly press (not shown) to facilitate threading of parts 156 and 158 into the shaft piece 164. The two parts 156 and 158 are held together during the threading by a round lug 170 on part 156 (FIG. 8) received within a complementary eye 172 of part 158. A pin 173 may also be used to hold the parts 156 and 158 in alignment. This affords torque locking the threads 160 and 162 against unwanted movement with respect to the shaft piece 164.

Figure 13:
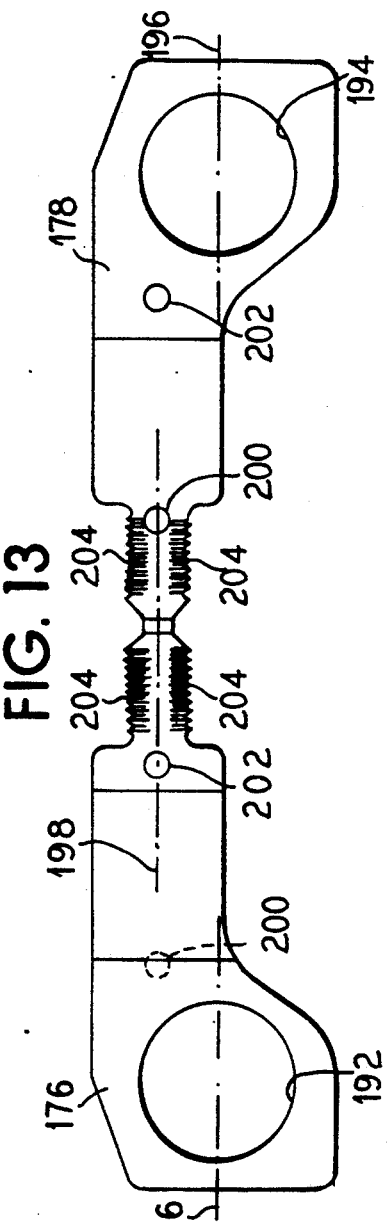
FIG. 13 is a side elevational view of an alternate embodiment of part of a pedal rod before folding.

FIGS. 13-15 show another embodiment of a male member 174 in which a first leg 176 has a configuration different than a second leg 178 thereby resulting in an offset male member in which end portions 180, 182 are offset, but parallel to a threaded end 184. The first leg 176 is connected by means of a strap 186 to the second leg 178. It is at the strap that the folded, threaded end 184 is provided in this embodiment. The first leg 176 has a series of bends 188 provided therein so that the free end portion 180 is parallel to, but laterally offset from the strap portion 186. The second leg 178 similarly has bends 190 which cause the free end 182 thereof to be offset, but parallel to the strap 186. Further, the first leg 176 has an aperture 192 therethrough and the second leg 178 has an aperture 194 therethrough. The two apertures 192, 194 are formed along a common center line 196 which, however, may be offset from a center line 198 of the strap. Thus, such a configuration provides an offset in two perpendicular directions.

Optionally, one or more tabs 200 may be provided on the legs 176, 178 which mate with apertures 202 to lock the two legs 176, 178 into precise positions prior to threaded insertion into a female member. Threads 204 may be formed on the strap portion as described above, that is, they may be pressed into the strap area before or after folding has occurred.

FIG. 20 shows a further embodiment of a male member 206 in which the leg portions 208, 210 are planar and identical in shape. As mentioned above, the threads 104, 106 are formed on the free ends 108, 110 rather than the folded end 114. Such an illustration is illustrative of this concept and could be applied to the male members of any configuration. The free ends of such other configured male members could include tabs or other projecting structures for receiving the threads if widths different than the width of the male member are required for the threaded portion.

Figure 21:
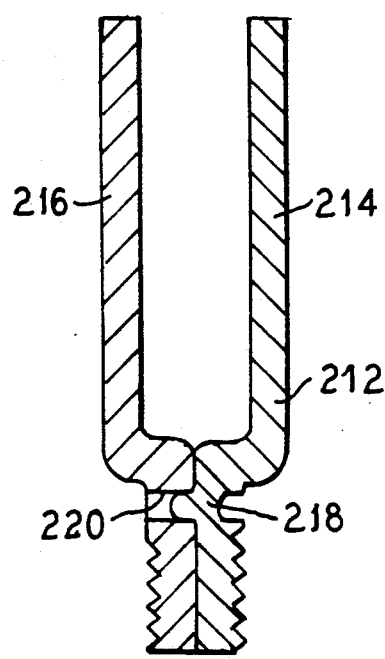
FIG. 21 is an edge elevational view of an alternate embodiment of a male member.

FIG. 21 shows another embodiment of a male member 212 in which a first leg 214 is formed separately from a second leg 216. In this particular embodiment the legs 214, 216 are shown to be identical in size and configuration so as to form a clevis, although they could be formed in different configurations such as those shown in the embodiments of FIGS. 13-15 and FIG. 20. Again, one of the legs has a projection 218 which mates with an aperture 220 formed in the other leg to provide alignment of the two legs. By forming the legs 214, 216 in two separate pieces, again, each of the legs could be configured differently to achieve a desired assembled shape, and each of the legs could be formed of a different material such as hard and soft metal or metal and plastic, or other combinations to achieve a threaded connection having a particular desired characteristic.

Although various figures illustrate the male member being inserted into a shaft or rod female member, the present invention is not so limited. The fastening system of the present invention may comprise a male member, of any configuration, folded, or formed in two pieces and with threads formed thereon as described, which is to be received in a threaded aperture of a female member, again of any configuration.

The torque required to rotate any one of the male members described above relative to the female member can be precisely selected by modifying one or more of three variables comprising the thickness T of the male member, the width W2 of the threaded portion and the number of thread segments formed on the male member.

By modifying the thickness T of the male member of the width W2, a desired radial pressure at the four edges of the male member, against the internal female threads will produce a desired required torque for rotating the members relative to one another. By selectively varying the thickness or width, the radial pressure and thus torque will be changed. The actual threads applied to the male and female member are standard threads and not interference threads. By selectively increasing the radial pressure, not only will a desired torque be achieved, but also the parts will be maintained in a locked condition to provide enhanced resistance against vibration loosening and yet allowing for repeatability or reuse of the fastener assembly. No special locking solution or chemical surface treatment is required to lock the two parts together.

Further, the use of interference threads is not required which is a distinct advantage in that interference threads are unreliable and produce erratic results whereas the present arrangement allows for precise consistent results as well as repeatability. Thus, the thread segments have standard pitch, standard depth and a standard thread angle.

To provide a constant torque, rather than an increasing torque as the male member is introduced into the female member, an arrangement such as that shown in FIGS. 16-19 can be utilized.

Figure 22:
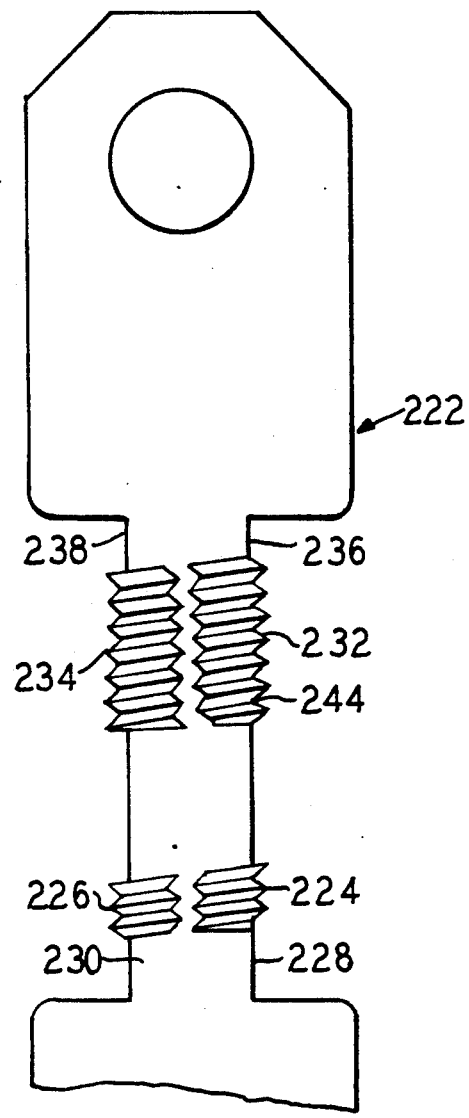
FIG. 22 is a partial side elevational view of the male member of FIG. 16, taken before folding.

FIGS. 16 and 22 a male member 222, which although shown in FIG. 22 as a folded type of male member, can be of any configuration including folded, two piece or even one piece without folds, has a selected number of thread segments 224, 226 formed on two adjacent edges 228, 230 and a more complete set of thread segments 232, 234 formed on the other two edges 236, 238. Thus, once the limited number of thread segments 224, 226 are introduced into a threaded aperture 240 of a female member 246, the torque will remain constant since no additional full threads are being introduced. The limited number of threads may be pressed into only one edge, two edges, three edges or all four edges as desired.

Such an arrangement (of limited numbers of thread segments on selected edges) can be provided, without additional machining expense, because as the threads are pressed into the male member, the entire threaded area is raised above the surrounding surface, including a root 244 of the thread. Thus, the crest 246 of the internal threads of the female member 242 will clear the areas adjacent the thread segments.

Thus, the particular desired torque can be selected by adjusting one or more of the three variable of thickness, width and number of full threads as described. Constant torque for the length of the insertion of the male member into the female member can be achieved by applying a selected number of thread segments to two adjacent edges when the thread segments are applied by pressing the threads into the male member.

Figure 9A:
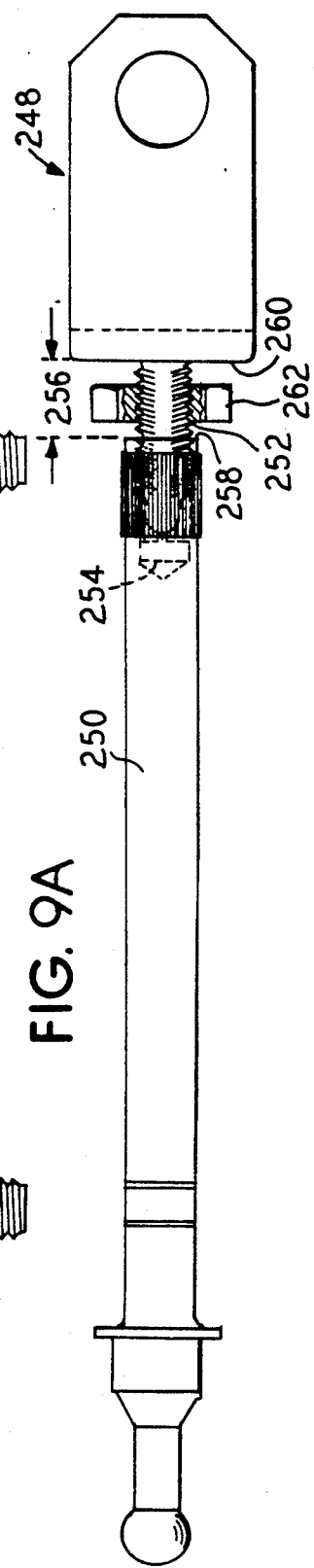
FIG. 9A is a side elevational view showing the adjustability of the length of a pedal rod.
Figure 9B:
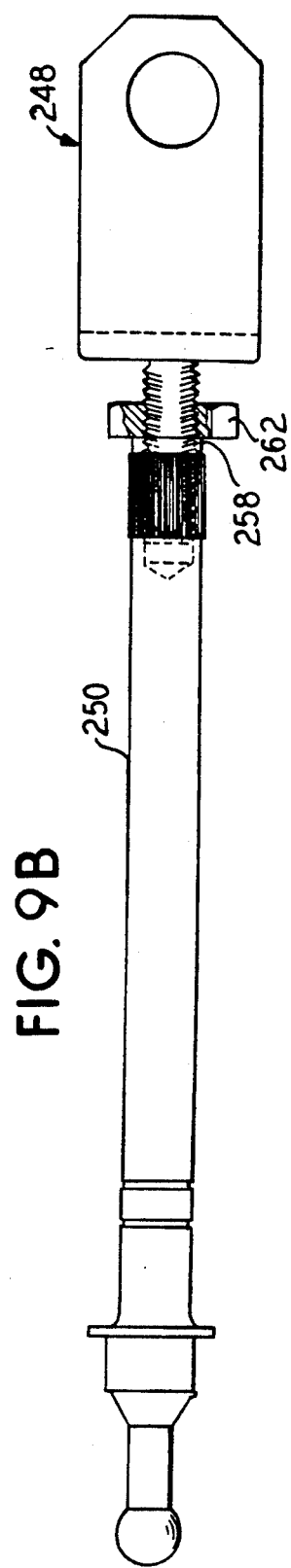
FIG. 9B is a side elevational view of the pedal rod of FIG. 9A with a nut locking the clevis piece in position.

FIGS. 9A-11 illustrate arrangements which doubly ensure the integrity of the threaded connection between the male member and a female member. In this embodiment, a male member 248 which is here illustrated as a clevis type male member, but which could be a male member of any configuration, is shown to be threaded into a female member 250 by virtue of external threads 252 on the male member mating with a threaded aperture 254 in the female member. In FIGS. 9A and 9B, the male member 248 has been threadly inserted into the female member 250 a sufficient distance to allow a locking of the male member 248 to the female member 250 due to the selected desired torque required for relative rotation of the two members. A space 256 exists between an end 258 of the female member and a bottom 260 of the clevis, which space allows for precise adjustability as to the overall length of the male and female assembly. Thus, final and precise adjustability of the length of the assembly can be achieved due to the symmetrical nature of the female member. Although the two members would be sufficiently locked together against rotation due to vibration by selection of a desired torque, it may be desired to doubly insure against relative rotation once a desired length for the assembly has been achieved. To that end, in the embodiment illustrated in FIGS. 9A and 9B, a separate nut 362 is carried on the threads 252. During assembly, the nut 262 can be positioned close to the bottom 260 of the clevis, but once the desired length is achieved by rotation of the female member 250 relative to the male member 248, the nut 262 is to be rotated on the threads 252 to move into tight abutment with the end 258 of the female member. When sufficient torque is applied to the nut 262, the nut will be locked against further rotation thus doubly ensuring the threaded connection. Such a double insurance arrangement still permits repeatability of the assembly, that is still permits the assembly to be disassembled merely by counter rotation of the nut and then counter rotation of the male member relative to the female member.

Figure 10A:
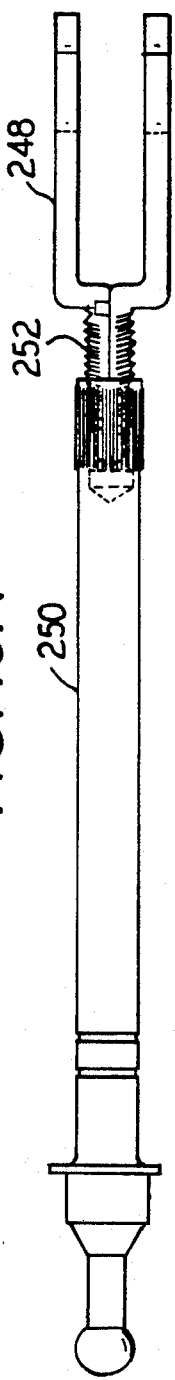
FIG. 10A is an edge elevational view showing the adjustability of the length of a pedal rod.
Figure 10B:
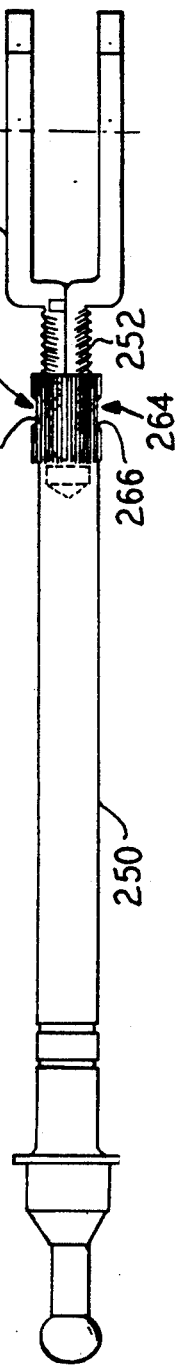
FIG. 10B is an edge elevational view of the pedal rod of FIG. 10A after the shaft has been crimped onto the clevis piece.
Figure 11:
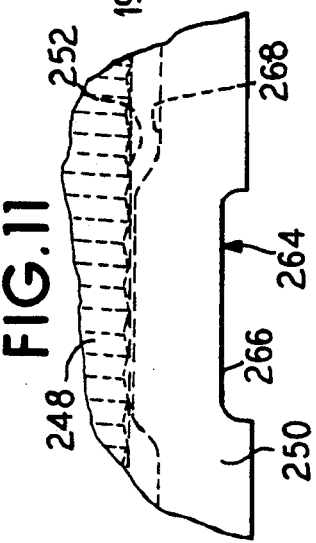
FIG. 11 is an enlarged view of one of the crimps shown in FIG. 10.

FIGS. 10A-11 illustrate a more permanent double insurance against rotation. In this embodiment, again the male member 248 is threaded into the female member 250 as described above with respect to FIGS. 9A and 9B until a desired final length is achieved. At that point, the female member 250 may be crimped at two opposite locations 264 by the application of opposed dimples 266 pressed into the female member at a portion overlying the threads 252. The dimple 266, as best seen in FIG. 11, will cause an interior surface 268 of the female member 250 to be displaced into abutting engagement with the male member 248. This particular arrangement of double ensuring against relative rotation between the male member and the female member will also make the connection permanent, that is, non reusable. With this type of double locking, only destruction of the assembly will permit removal of the male member from the female member.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A fastener system comprising:
   a first member having a threaded aperture therein;
   a second member having two at least partially overlying legs, said legs, at overlying portions thereof, having at least segments of external threads formed thereon which are engageable with said internal threads of said first member, said overlying portions being planar across a full width thereof and in flush abutting engagement across said width.

2. A fastener system according to claim 1, wherein said second member is bent over at a fold so that said legs are in an overlying relationship.

3. A fastener system comprising:
   a first member having a threaded aperture therein;
   a second member having two at least partially overlying legs, said legs, at overlying portions thereof, having at least segments of external threads formed thereon which are engageable with said internal threads of said first member, said overlying portions being planar and in flush abutting engagement, said second member being bent over at a fold so that said legs are in an overlying relationship, and
   wherein said thread segments are formed at an end adjacent to said fold.

4. A fastener system according to claim 2, wherein said thread segments are formed at an end opposite said fold.

5. A fastener system comprising:
   a first member having a threaded aperture therein;
   a second member having two at least partially overlying legs, said legs, at overlying portions thereof, having at least segments of external threads formed thereon which are engageable with said internal threads of said first member, said overlying portions being planar and in flush abutting engagement.
   said second member comprising two separate pieces, each having a leg, and assembled such that said legs are in an overlying relationship.

6. A fastener system according to claim 5, wherein said two separate pieces are formed of different materials.

7. A fastener system comprising:
   a first member having a threaded aperture therein;
   a second member having two at least partially overlying legs, said legs, at overlying portions thereof, having at least segments of external threads formed thereon which are engageable with said internal threads of said first member, said overlying portions being planar and in flush abutting engagement,
   said second member comprising two male members forming said legs, each formed of one piece, said male members having parts spaced from each other and other parts in flat face abutment, said other parts having external threads in engagement with said internal threads, and means on said male members for maintaining said abutment.

8. A fastener system according to claim 1, wherein said overlying portions of said legs have a generally rectangular cross section with edge portions having said thread segments thereon, at least one of a width of said overlying portions, a thickness of said overlying portions and a number of thread segments on at least one edge portion being selected to provide a locking torque between said members when engaged, whereby said members can be joined upon application of said torque in a first direction to said members to lock the members together, yet said members can be disengaged from one another upon application of said torque in an opposite direction, thereby permitting repeatability of said threaded connection between said two members.

9. A fastener system according to claim 1, wherein means are provided for preventing relative rotation between said first and second members, at least below application of a predetermined torque.

10. A fastener system according to claim 9, wherein said means for preventing relative rotation comprises configuring said internal and external threads so as to provide a fit therebetween requiring an application or torque above said predetermined torque in order to have relative solution between said parts.

11. A fastener system according to claim 10, wherein said means for preventing relative rotation comprises sizing an effective diameter of said thread segments to produce a radial pressure between said internal and external threads sufficient to require said application of torque above said predetermined torque in order to have relative rotation between said parts.

12. A fastener system comprising:
a first member having a threaded aperture therein;
a second member having two at least partially overlying legs, said legs, at overlying portions thereof, having at least segments of external threads formed thereon which are engageable with said internal threads of said first member, said overlying portions being planar and in flush abutting engagement;
means for preventing relative rotation between said first and second members, at least below application of a predetermined torque, comprising dimples crimped into said first member in an area engaged by said second member.

13. A fastener system comprising:
a first member having a threaded aperture therein;
a second member having two at least partially overlying legs, said legs, at overlying portions thereof, having at least segments of external threads formed thereon which are engageable with said internal threads of said first member, said overlying portions being planar and in flush abutting engagement;
means for preventing relative rotation between said first and second members, at least below application of a predetermined torque, comprising a movable nut carried on said threaded overlying portions of said second member engageable with said first member.

14. A method of increasing the torque required to rotate an externally threaded member into an internally threaded aperture, wherein said externally threaded member has a portion with a generally rectangular cross section with edge portions having thread segments thereon, comprising at least one of the steps from the group consisting of:
selecting an externally threaded member having a width at the threaded portion of said rectangular cross section greater than a width at the threaded portion of a previously used externally threaded member that precisely fit within said threaded aperture;
selecting an externally threaded member having a thickness at the threaded portion of said rectangular cross section greater than a thickness at the threaded portion of a previously used externally threaded member that precisely fit in said threaded aperture; and
selecting an externally threaded member having a number of thread segments on at least one edge portion of said externally threaded member greater than a number of thread segments at the threaded portion of a previously used externally threaded member which had thread segments along said one edge portion spanning an axial length less than the extent of penetration of said externally threaded member into said internally threaded aperture so that a greater maximum number of thread segments will engage said internally threaded aperture.

15. A self locking fastener system comprising:
a first member having a threaded aperture therein;
a second member having an inflexible end portion, said end portion having a generally rectangular cross section with edge portions having thread segments thereon, engageable with said threaded aperture to form a threaded connection between said members; and
means for adjusting the amount of surface area engagement between said first member and second member comprising at least one of said width of said end portion, a thickness of said end portion and the number of thread segments on at least one edge portion of sad end portion, being selected to provide a locking torque between said members when engaged, whereby said members can be joined upon application of said torque in a first direction to said members to lock the members together, yet said members can be disengaged from one another upon application of said torque in an opposite direction, thereby permitting repeatability of said threaded connection between said two members.

16. A self locking fastener system comprising:
a first member having a threaded aperture therein;
a second member having an end portion, said end portion having a generally rectangular cross section with edge portions having thread segments, engageable with said threaded aperture to form a threaded connection between said member; and
at least one said width of said end portion, a thickness of said end portion and the number of thread segments on at least one edge portion of said end portion, being selected to provide a locking torque between said members when engaged, whereby said members can be joined upon application of said torque in a first direction to said members to lock the members together, yet said members can be disengaged from one another upon application of said torque in an opposite direction, thereby permitting repeatability of said threaded connection between said two members:
said second member comprising a folded over piece with said thread segments formed at a folded end of said piece.

17. A self locking fastener system according to claim 15, wherein said second member comprises a folded over piece with said thread segments formed at an end opposite a folded end of said piece.

18. A fastening system providing a desired constant torque between a threaded aperture and a threaded member, comprising:
a first member having an aperture which is internally threaded along its length;
a second member having an end portion with a generally rectangular cross-section defining four edges and having thread segments at said edges in size so as to provide radial contact between said thread segments and said internally threaded aperture;
said thread segments at least one edge extending along a length less than a threaded length of said first member aperture when said second member is fully engaged with said first member such that a predetermined number of thread segments will be in engagement with said threaded aperture to provide said desired constant torque.

19. In combination, a female member with internal threads, a male member formed of one piece folded over to define two segments separated by an unthreaded portion, each of said segments having threads mated with the threads of the female member at one side of its longitudinal axis, wherein said male member comprises a flat one-piece strap having enlarged end portions and a relatively narrow strap connected to both of said end portions, said end portions having connecting means for related apparatus, a score extending across said narrow strap, and said threads being formed on said narrow strap, said male member being folded on said score so that the threads become right and left when folded together, and aligning means for said threads on said narrow strap.

20. A combination according to claim 19, wherein the threads of the segments press partially outwardly of the female member to afford at least 5-40 inch pounds of torque.

21. In a method of making a connection, the steps of making a female member, forming internal threads within said member, forming a pair of male members having rectangular cross sections, placing said male members in flat abutment at corresponding surfaces thereof, threading said male members at four edges thereof surrounding said abutting surfaces thereof, forming a readily releasible connection between said male members to hold said abutting surfaces together and to align said male members and prevent lateral and longitudinal movement therebetween, and then mating the threads of the female member with those of the male members.

22. A method according to claim 21, wherein the threads of the male members during the mating process react with the releasable connection to afford torque locking the threads of the male members with those of the female member.

23. In combination,
a male member being generally rectangular in cross-sectional configuration, thereby to provide four separate longitudinal edges;
a selected number of helical external screw thread segments formed on at least two of said edges;
a smaller selected number of helical external screw thread segments formed on at least one of the other of said edges;
a first annular shoulder on said male member; and
a female member having a second annular abutment shoulder for selectively sealingly engaging said first annular shoulder on said male member,
said female member having an internally extending recess fully threaded with mating helical threads to receive said male member and to engage said external screw thread segments on said edges;
whereby said male and female members can be locked together without requiring the use of a supplemental liquid or paste sealant.

24. A fastener system comprising:
a first member having a threaded aperture therein;
a second member having two at least partially overlying legs, said legs, at overlying portions thereof, having at least segments of external threads formed thereon which are engageable with said internal threads of said first member, and at said overlying portions thereof, said legs being in flat abutment with each other, and said legs including engagement means therebetween for preventing lateral and longitudinal movement therebetween when said legs are in abutment.

25. A fastener system comprising:
a first member having a threaded aperture therein;
a second member having two at least partially overlying legs, said legs, at overlying portions thereof, having at least segments of external threads formed thereon which are engageable with said internal threads of said first member, said threads being formed at one end of said legs, and towards an opposite end of said legs, said legs each having a flat portion defining a plane, said portions being parallel to each other, and an aperture in each of said portions, said apertures being in alignment, perpendicular to said planes of said flat portions.

26. In combination,
a male member being shaped in cross-sectional configuration to provide a plurality of circumferentially spaced apart separate longitudinal edges;
a selected number of helical external screw thread segments formed on a least two of said edges;
a smaller number of helical external screw thread segments formed on at least one of the other of said edges;
said female member having an internally extending recess fully threaded with mating helical threads to receive said male member and to engage said external screw threads on said edges;
whereby said male and female members can be locked tight in sealed together relation,
at least one said width of said end portion, a thickness of said end portion; and
the number of thread segments on at least one edge portion of said end portion, being selected to provide a locking torque between said members when engaged;
whereby said male and female members can be joined upon application of said torque in a first direction to said members to lock the members together;
yet said members can be disengaged from one another upon application of said torque in an opposite direction;
thereby permitting repeatability of said threaded connection between said two members.

27. In combination, the invention as defined in claim 26 and further characterized by crimped dimple means pressed into the female member at a portion overlying the threaded portion;
said dimple means displacing an interior surface of the female member into abutting engagement with the inwardly adjacent male member;
thereby to permanently lock the male and female members in permanently firm assembly with one another.

28. In combination as defined in claim 26 wherein said male member comprises an elongated member having two legs interconnected by a central strap;
said edge having the screw threads formed thereon being formed on said legs and said legs being folded back upon themselves into coalignment with one another by means of a hinged folding joint in said central strap.

29. In combination as defined in claim 26 wherein said male member comprises:

two distinct segments together forming a unitary body for the male member having a cross sectional configuration to provide separate longitudinal edges;

said segments having detent means formed therebetween comprising a lug and a recess and together operating to hold the segments in firm assembly with one another and to insure that the threads and thread segments are appropriately matched and aligned for the purposes set forth.

* * * * *